Dec. 23, 1930.  G. P. MURPHEY  1,785,874
RECORDING INSTRUMENT
Filed June 17, 1927  3 Sheets-Sheet 1
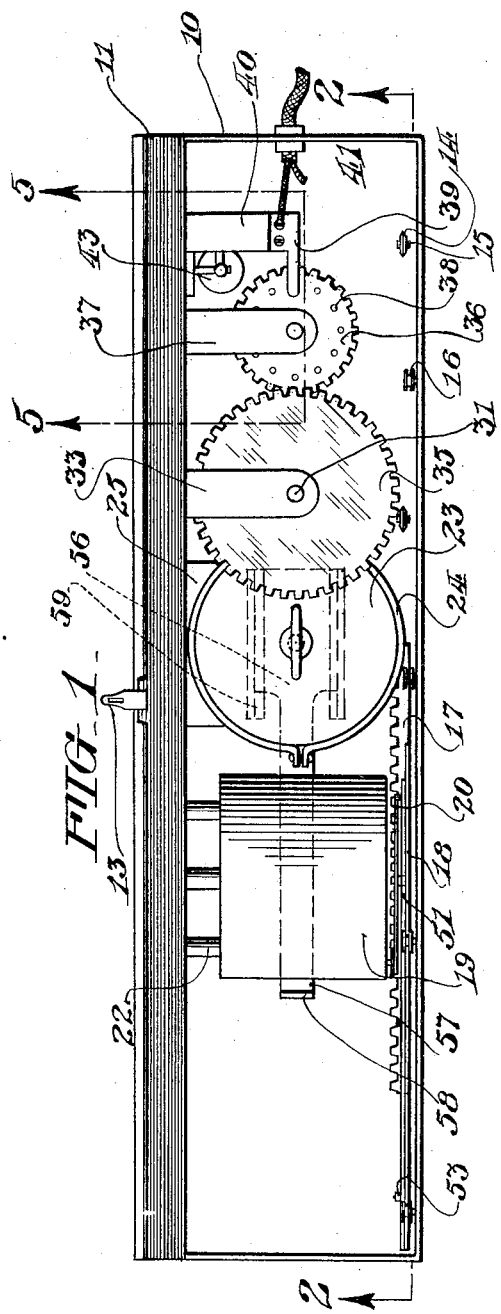
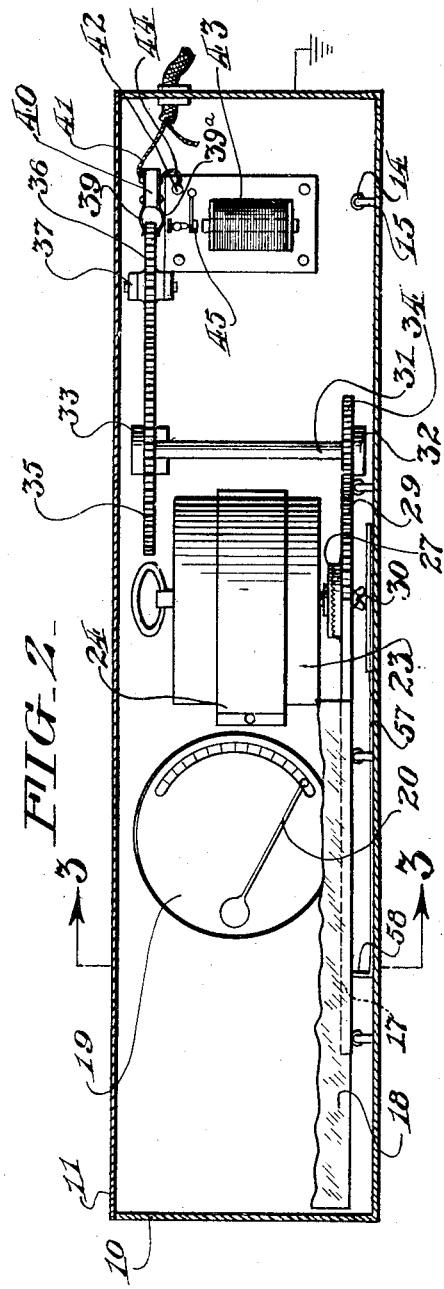
WITNESSES:
Harry C Bright
INVENTOR:
George Paseson Murphey
BY
Joshua R H Potts
ATTORNEY

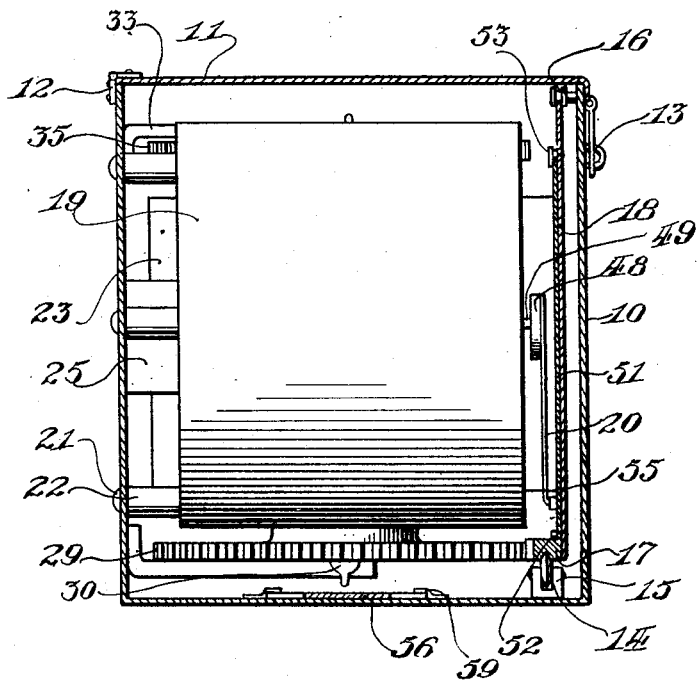

Dec. 23, 1930.   G. P. MURPHEY   1,785,874
RECORDING INSTRUMENT
Filed June 17, 1927   3 Sheets-Sheet 3

WITNESSES:
Harry C Bright
Wesley P Muriel

INVENTOR:
George Paseson Murphey
BY
Joshua R. H. Potts
ATTORNEY

Patented Dec. 23, 1930

1,785,874

UNITED STATES PATENT OFFICE

GEORGE PAXSON MURPHEY, OF PHILADELPHIA, PENNSYLVANIA

RECORDING INSTRUMENT

Application filed June 17, 1927. Serial No. 199,449.

My invention relates to recording instruments and more particularly to an instrument adapted to record the speeds of a moving vehicle throughout a given period of time.

It is a well known fact that trucks operated beyond a given speed are damaged by such excess speed and it is also a well known fact that many drivers will speed the truck during one or more portions of a trip and will then lay up at some spot along their route, so that the time consumed for the trip is not greatly in excess of that scheduled, in order that they may be able to loaf for a considerable period on each trip without much danger of detection.

An object of my invention is to provide a device, adapted to be installed on a truck or other motor vehicle, which will record the speed of such vehicle at stated intervals so that the various speeds at which the truck was driven throughout the working period may be ascertained at any time.

The above object is accomplished through instrumentalities, the principal features of which are the provision of two terminals of an electric circuit, one of which is in the nature of a member moving so as to indicate the speed of a moving member to which it is attached, the other terminal being preferably movable relative thereto and a chart positioned between said terminals and movable relative to the first named terminal. The said first named terminal may be in the nature of an arm of a speedometer of the ordinary type.

The effectiveness of this arrangement may be enhanced by providing means for causing an electric current to pass intermittently through the circuit of which the above terminals are a part. This means may be in the nature of a rotating switch having spaced conductive members which are brought by the rotation thereof into electrical contact between two spaced terminals in the circuit.

While my invention is adapted for use on any motor vehicle and will record the speed of such vehicle throughout a given period of time and would thus produce evidence in favor of the vehicle operator in case he was arrested for speeding when he was not guilty of this offense, it will be described in connection with its use on a commercial vehicle; and another object of my invention is to so design the structure that its working parts may not be tampered with by the operator of the vehicle.

In the drawings:

Figure 1 is a top plan view of an embodiment of my invention; the cover of the casing being shown in raised position.

Figure 2 is a vertical sectional view taken on line 2—2 on Figure 1; the card and ground-plate being broken away in order to illustrate the speedometer.

Figure 3 is an enlarged cross sectional view taken on line 3—3 on Figure 2.

Figure 4 is an enlarged fragmentary view of the clock; the driving gear, hub and nut being shown in cross-section.

Figure 5 is an enlarged central cross-sectional view through the contact wheel; a fragment of the contact arm being shown in full and the view taken substantially on line 5—5 on Figure 1.

Figure 7:
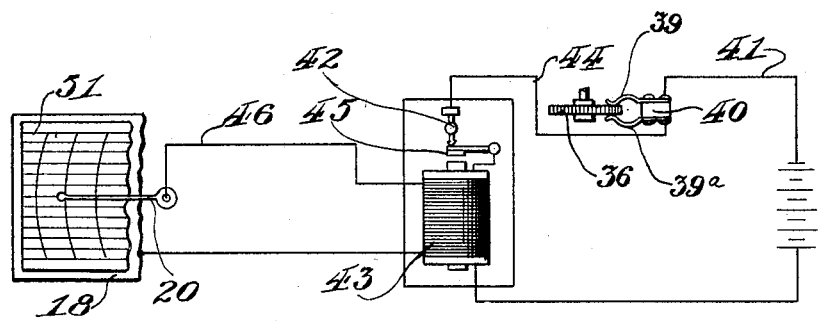
Figure 8:
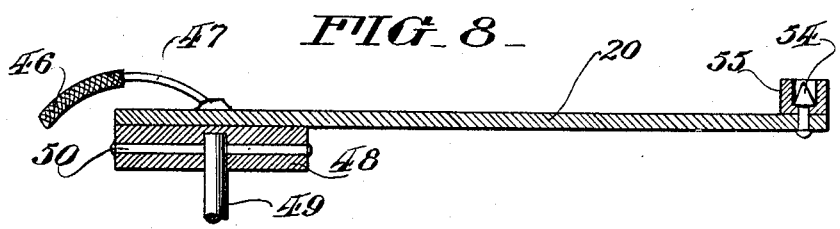

Figure 7 a wiring diagram of an electrical circuit suitable for use with the invention herein described, and Figure 8 an enlarged central longitudinal sectional view of the indicating needle.

Referring now more in detail to the drawings, the recording device is shown as being mounted in a casing 10 having a cover 11 secured thereto by hinges 12 and adapted to be secured in place by a hasp and staple 13. A series of rollers 14 are revolubly mounted in bearings 15 secured to the bottom of casing 10 and a series of rollers 16 are revolubly mounted near the upper edge of the front wall of casing 10 so that a rack 17, having a suitable groove on its under face, may rest on rollers 14 while the upper edge of a ground-plate 18, rigidly secured to rack 17, is guided by engaging rollers 16.

A speedometer 19, having an indicating needle 20, is secured in casing 10 in any suitable manner as by having screws 21 extending through suitable apertures in casing 10 and threaded into lugs 22 formed integral with the speedometer shell. A clock mechanism 23 is mounted in casing 10 in any suitable manner, as by having a band 24 encircling the clock and secured to a block 25 fixed to casing 10. A shaft 26, to which the hour hand of the clock would ordinarily be attached, extends from the lower side of clock 23 and has a hub 27 rigidly secured thereto and provided with fine teeth or notches 28 on its under face. A gear 29, meshing with rack 17, is revolubly mounted on shaft 26 and provided on its upper face with a series of teeth or notches adapted to register with notches 28 on hub 27 when a thumb nut 30, threaded onto the lower end of shaft 26, is tightened to move gear 29 into contact with hub 27.

A countershaft 31, suitably mounted in bearings 32 and 33 fixed in casing 10, has a pinion 34 fixed to its lower end and meshing with gear 29 and a gear 35 fixed to its upper end and meshing with a contact wheel 36 rotatably mounted in a bearing 37 fixed to casing 10. A series of metal inserts 38 extend through contact wheel 36 at spaced intervals on a fixed radius and are adapted to be engaged on either end by spring contacts 39 and 39$^a$ which are suitably mounted on a contact arm 40 secured to the inside of casing 10.

A wire 41 connects contact 39 with a source of electrical energy, such as the positive terminal of the battery, or to the magneto if the vehicle is not provided with a battery, and casing 10 is grounded to the truck frame, providing that the negative side of the battery is also grounded to the truck frame. Contact 39$^a$ is connected to the vibrator point 42 of an induction coil 43 by means of a wire 44. One end of the primary winding of induction coil 43 is connected to the vibrator 45 and the other end grounded to casing 10. One end of the secondary winding of induction coil 43 is connected to indicating needle 20 by means of a wire 46 and the other end of the winding is grounded to casing 10; wire 46 being connected to the needle by means of a suitable pigtail 47, soldered over the center of rotation of the needle, and the needle insulated from the speedometer by being secured to an insulating hub 48 fixed on the speedometer shaft 49 in any suitable manner as by a pin 50 passed through the hub and the shaft.

Figure 6:
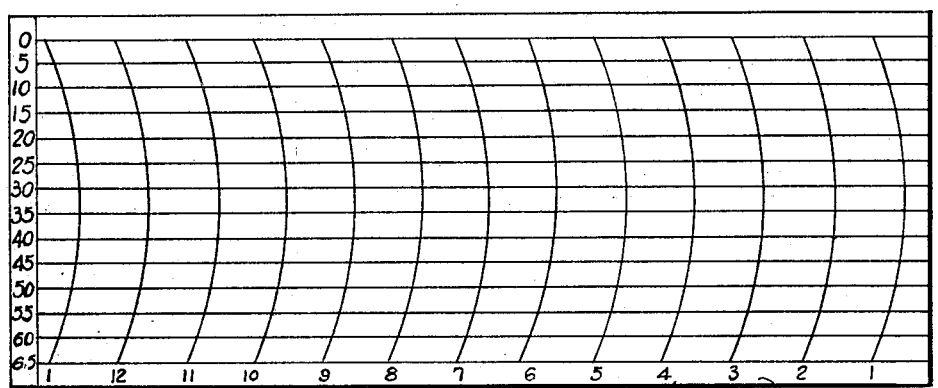
Figure 6 is an enlarged plan view of the record card.

While the record may be made on a strip or roll of paper as well as upon a card, I have shown my device as adapted to register the speed of the vehicle at stated intervals upon a card 51 which is removably mounted upon ground-plate 18 by being inserted behind lugs 52 secured to the top of rack 17 and engaged along its upper edge by clips 53 secured near the upper edge of ground-plate 18. Card 51 may be graduated to suit the requirements of each individual case but has been shown in Figure 6 as being graduated longitudinally into one hour spaces and vertically into five mile spaces; it being understood that, in practice, card 51 will be graduated into much smaller time intervals, such as intervals of from two to five minutes.

Assuming that the parts are in the position shown in Figures 1 and 2, wire 41 connected to a suitable source of electrical energy, and speedometer 19 connected to a moving part of the vehicle in the customary manner, my device would operate as follows:

Clock mechanism 23, being wound up, would cause rotation of gear 29 which will move rack 17 longitudinally of casing 10 and simultaneously rotate contact wheel 36 through gears 34 and 35. As an insert 38 comes between contacts 39 and 39$^a$, an electrical current will flow from the battery through wire 41, contact 39, insert 38, contact 39$^a$, wire 44, vibrator point 42, vibrator 45, primary winding of coil 43, to casing 10, which is grounded in common with the negative pole of the battery, and induce a high tension current in the secondary winding of the coil as well as magnetizing the core of the induction coil and causing it to attract vibrator 45 and break the circuit. As one end of the secondary winding is connected to needle 20 and the other end and ground-plate 18 grounded on casing 10, the high tension current momentarily set up will jump the gap between the point 54 of needle 20 and ground-plate 18 and puncture card 51; the location of the puncture in the card indicating the time at which the record was made and the speed of the vehicle at that instant. The point 54 of needle 20 is adapted to remain in close proximity to the face of card 51 and is prevented from coming into actual contact therewith by means of a small insulating bushing 55 rigidly secured to the outer end of the needle and having a central aperture containing point 54 so that it extends into close proximity with the outer face of bushing 55, thus allowing bushing 55 to actually contact with the face of the card, due to the vibrations of the moving vehicle, without danger of the needle catching therein; the needle being adjusted so that bushing 55 just misses card 51.

As long as the vehicle remains stationary, indicating needle 20 will, of course, remain at the zero point and the punctures in the card made by the electrical sparks will follow the zero line. As soon as the vehicle starts to move, needle 20 will swing upwardly in proportion to the speed of the vehicle and sparks, passed through the card at any spaced intervals, will record the speed of the vehicle at all times throughout the length of the trip or the working day.

Card 51 has been illustrated as having the zero line at the top of the card so that it will register with the point of needle 20 when mounted on ground-plate 18 with the face of the card toward the speedometer. However, it is understood that the card may be graduated and numbered to meet the requirements of the individual user. The intervals between sparks will be governed by the ratio of pinion 34 and gear 35 to gear 29 and contact wheel 36, respectively, and the spaces between adjacent inserts in contact wheel 38; thus making it possible to produce an almost continuous discharge of electrical sparks through card 51 or the discharge of a spark at considerable intervals of say ten or more minutes.

After the vehicle has completed its day's work, the card may be removed and a fresh one inserted ready for the next day's operation of the vehicle. In case the card is not removed and the mechanism reset, no damage results as the teeth on rack 17 are omitted from the left hand end so that continued rotation of gear 29 merely moves rack 17 out of mesh with said gear before the other end of the rack can come into contact with the end of casing 10. To reset the mechanism, thumb nut 30 is loosened so that gear 29 may drop downwardly out of contact with hub 27, a fresh card inserted on ground-plate 18 and the plate pushed to its extreme left hand position and, when the vehicle is ready to go into operation again, thumb nut 30 tightened.

In order that the driver of the vehicle or other unauthorized person may not loosen thumb nut 30 and thus stop operation of the device, I form an aperture in the bottom of casing 10, through which thumb nut 30 is reached, and close same with a suitable slide 56 having an elongated handle 57, the end of which is turned upwardly to form a finger grip 58. Slide 56 is mounted between suitable guides 59 disposed at either side of the opening in casing 10 so that slide 56 may not be moved except from the inside of casing 10 and, as cover 11 may be locked in closed position, the mechanism cannot be reset except by an authorized person.

It is to be understood that the above described device is to be taken as illustrative of the principles of my invention and that the same may be modified and changed in various ways without departing from the spirit of the invention as hereinafter claimed.

I claim:—

1. A recording instrument including a speed indicator having an oscillating pointer, a tip on the pointer, an insulator surrounding the tip, a terminal plate disposed in close proximity to the tip, a chart secured to the terminal, an induction coil having the ends of its secondary winding connected to the pointer and to the terminal respectively, means for moving the terminal plate, and means for intermittently furnishing the induction coil with electrical current.

2. In a device of the character described having a speed indicator, an oscillating pointer on the indicator, a tip on the pointer, and a chart traveling in close proximity to the tip; means for preventing the tip from engaging the chart consisting of a bushing surrounding the tip.

3. In a device of the character described having a speed indicator, an oscillating pointer on the indicator, a tip on the pointer, and a chart traveling in close proximity to the tip; means for preventing the tip from engaging the chart consisting of an insulating bushing surrounding the tip and secured to the pointer by the tip.

4. In a device of the character described having a speed indicator, means for moving a chart relatively to the indicator including a rack, a plate secured to the rack and adapted to support the chart, rollers supporting the rack, a second set of rollers engaging the plate for guiding same, a gear meshing with the rack, and means for rotating the gear at a uniform speed.

5. A speed recording instrument comprising a speed responsive unit, a rack movable in juxta-position to the speed unit, rollers supporting the rack, means to move the rack upon the rollers with uniform progression, a chart carried by the rack and means actuated by the speed unit to trace a track upon the chart.

6. A speed recording instrument comprising a speed responsive unit, a rack movable in juxta-position to the speed unit, rollers supporting the rack, means to move the rack upon the rollers with uniform progression, a plate carried by the rack, a chart carried by the plate, other rollers tending to maintain the planer position of the plate, and means actuated by the speed unit to trace a track upon the chart.

In testimony whereof I have signed my name to this specification.

GEORGE PAXSON MURPHEY.